(12) United States Patent
Ramey et al.

(10) Patent No.: US 7,111,056 B1
(45) Date of Patent: Sep. 19, 2006

(54) METHOD, APPARATUS AND ARTICLE OF MANUFACTURE FOR WEB-BASED CONTROL OF A UNIFIED MULTI-SERVICE COMMUNICATION SYSTEM

(75) Inventors: K. Scott Ramey, Stittsville (CA); Michel Burger, Palo Alto, CA (US); Larry David, Woodlawn (CA)

(73) Assignee: Nortel Networks Limited, St. Laurent (CA)

( * ) Notice: Subject to any disclaimer, the term of this patent is extended or adjusted under 35 U.S.C. 154(b) by 6 days.

(21) Appl. No.: 09/414,590

(22) Filed: Oct. 8, 1999

(51) Int. Cl.
 *G06F 15/173* (2006.01)
 *G06F 15/16* (2006.01)
(52) U.S. Cl. ..................... 709/223; 709/203
(58) Field of Classification Search ............... 709/203, 709/223
 See application file for complete search history.

(56) References Cited

U.S. PATENT DOCUMENTS

| | | | |
|---|---|---|---|
| 5,619,555 A * | 4/1997 | Fenton et al. ............ | 379/88.11 |
| 5,805,587 A * | 9/1998 | Norris et al. ............... | 370/352 |
| 5,867,153 A | 2/1999 | Grandcolas et al. | |
| 5,884,262 A * | 3/1999 | Wise et al. .............. | 704/270.1 |
| 5,923,736 A | 7/1999 | Shachar | |
| 5,923,738 A | 7/1999 | Cardillo, IV et al. | |
| 5,937,041 A | 8/1999 | Cardillo, IV et al. | |
| 5,953,392 A * | 9/1999 | Rhie et al. ............... | 379/88.13 |
| 5,958,016 A | 9/1999 | Chang et al. | |
| 5,978,806 A | 11/1999 | Lund | |
| 6,049,596 A * | 4/2000 | Dumaine et al. ......... | 379/93.05 |
| 6,091,808 A * | 7/2000 | Wood et al. ............ | 379/201.04 |
| 6,185,194 B1 * | 2/2001 | Musk et al. ................ | 370/260 |
| 6,192,338 B1 * | 2/2001 | Haszto et al. ............... | 704/257 |
| 6,205,582 B1 * | 3/2001 | Hoarty ........................ | 725/93 |

(Continued)

FOREIGN PATENT DOCUMENTS

EP  0 836 295 A2 * 4/1998

(Continued)

OTHER PUBLICATIONS

Gralla, P., How Intranets Work, Ziff-Davis Press, pp. 94-99, 1996.*

(Continued)

*Primary Examiner*—Larry D. Donaghue (57) ABSTRACT

A method, apparatus, and article of manufacture for controlling the call control, service control, and user interface functions of a legacy telephone system from a web application. The web application communicates with a legacy call server and controls the legacy call server. A web application also communicates with a legacy telephony device and controls the legacy telephony device. A communication channel may be provided between the web application and the legacy call server, and data transferred over the communication channel is translated to a form that each can understand. The data may be a call control command or a service control command. A communication channel may be provided between the web application and the legacy telephony device, and data transferred over the communication channel is translated to a form that each can understand. The data may be translated to a legacy telephony device data format, and to a web API data format. An abstraction may be used to represent a telephony device or a class of telephony devices having similar characteristics. Access to the telephony device may be arbitrated, and data from the telephony device may be routed. A service plugin may be provided as an interface to the web application. An execution environment may be provided to allows dynamic insertion of service plugins. The data being transferred may be mapped to a telephony device resource. The web application may be an interface to another telephony device, so that telephony devices can communicate peer to peer.

21 Claims, 6 Drawing Sheets

U.S. PATENT DOCUMENTS

| | | | |
|---|---|---|---|
| 6,243,445 B1 * | 6/2001 | Begeja et al. | 379/93.01 |
| 6,263,051 B1 * | 7/2001 | Saylor et al. | 379/88.17 |
| 6,335,928 B1 * | 1/2002 | Herrmann et al. | 370/352 |
| 6,400,820 B1 * | 6/2002 | Edwards et al. | 379/265.01 |
| 6,430,175 B1 * | 8/2002 | Echols et al. | 370/352 |
| 6,445,694 B1 * | 9/2002 | Swartz | 370/342 |
| 6,791,974 B1 * | 9/2004 | Greenberg | 370/352 |
| 2001/0028654 A1 * | 10/2001 | Anjum et al. | 370/401 |

FOREIGN PATENT DOCUMENTS

| | | | |
|---|---|---|---|
| EP | 0 859 500 A2 * | 8/1998 | |
| WO | WO 98/16051 | * | 4/1998 |
| WO | WO 98/18283 | * | 4/1998 |
| WO | WO 99/40712 | * | 8/1999 |

OTHER PUBLICATIONS

Java Telephony API: An Overview, version 1.1, pp. 1-41, Jan. 28, 1997.*

Bornhoft, M., et al., Computer-Switch Telephony Applications, IEE, Third IEE Conf. on Telecommunications, 1991, pp. 62-66, 1991.*

Atkins, D., et al., Mawl: A Domain-Specific Language for Form-Based Services, IEEE Trans. on Software Engineering, vol. 25, No. 3, p. 334-346, Jun. 1999.*

Low, C., The Internet Telephony Red Herring, HP Laboratories Technical Report, No. 96/98, May 15, 1996, pp. 1-15.*

StarVox Solutions: Solutions Overview (visited Dec. 2, 1999) www.starvox.com/solutions>, pp. 1-5.

StarVox Products: Products Overview (visited Dec. 2, 1999) www.starvox.com/products>, pp. 1-5.

Low C. et al.: "WebIN—An Architecture for Fast Deployment of In-Based Personal Services", Workshop Record, Intelligent Network, Freedom and Flexibility: Realising the Promise of Intelligent Network Servives, Apr. 21, 1996. pp. 1-12, XP002043670.

Sebastiano, Trigila, Vieenzo Bonafede: "Dolmen—Service Machine Development for an Open Long-Term Mobile and Fixed Network Environment (extends TINA Architecture", Internet 'Online?, Feb. 18, 1999, XP002259833, retrieved from the Internet: <URL:http://www.tinac.com>.

* cited by examiner

METHOD, APPARATUS AND ARTICLE OF MANUFACTURE FOR WEB-BASED CONTROL OF A UNIFIED MULTI-SERVICE COMMUNICATION SYSTEM

I. BACKGROUND OF THE INVENTION

A. Field of the Invention

The present invention relates generally to independently controlling the elements of a communications system and more particularly to methods, apparatus, and articles of manufacture for web-based control of a communications system.

B. Description of the Related Art

A legacy telephone system typically includes a number of telephone sets coupled to a private branch exchange (PBX) by physical wiring. A call server resides in the PBX and handles many different call-related functions for the telephone sets. Call control functions, service control functions, and user interface functions are typically controlled by the call server. Although several of those call-related functions can be initiated by users of the telephone sets, many are generally inaccessible. More specifically, while the call server can be controlled by a limited number of commands available to a user, many additional commands can only be issued by system administrators using restricted access interfaces.

Call control functions, such as call connection, call disconnection, and connection of the members of a conference call, are typically performed by a call server in response to a command from a telephone set coupled to the telephone system. For example, such a command could be the act of dialing a telephone number. Service control functions, such as establishing a conference call, performing last number redial, and initiating a voice mail function can be performed by a call server in accordance with a "policy" applied to a user's telephone. A system administrator controls the policy, and thus controls which services are available to a user, by issuing commands to the call server through the restricted interface. Accordingly, users have a limited degree of control over the services available to them, which can typically be expanded only by contacting the telephone system administrator.

A need exists to expand the functionality of legacy telephone systems such that users thereof have greater control over their associated call server and telephone set. Thereby, users can access greater functionality without having to communicate requests to a telephone system administrator. Such a methodology increases the usefulness of legacy telephone systems by allowing them to be highly configurable by a user.

II. SUMMARY OF THE INVENTION

Methods, apparatus, and systems consistent with the principles of the present invention allow web-based control of the call control, service control and user interface functions of a legacy telephone system. The invention enables a legacy call server and a legacy telephony device to communicate with each other and with a web application. The invention uses the web application to control the legacy call server and the legacy telephony device, which perform the call control, service control and user interface functions of the telephone system. The web application also links the legacy call server and legacy telephony device to other web applications which supply data. A proxy server may be used to control access to the call server.

The invention may also provide a channel over which the web application and the call server communicate. The communications may include typical call server control commands, such as call control commands for controlling telephone calls or service control commands for controlling telephone services. The invention may also translate data communicated between the call server and the web application.

The invention may also provide a channel over which the web application and the telephony device communicate. The invention may also translate data communicated between the telephony device and the web application. The invention may use an abstraction of the resources of a telephony device, or a class of several different telephony devices having similar characteristics. Web application data directed to abstract resources of a telephony device may be mapped to an actual resource of the device. The invention can also arbitrate access to a telephony device, and can route data from a telephony device to a specific web application. The invention may also use service plugins to provide an interface with web applications. Furthermore, the invention allows a web application to be the interface to another telephony device.

Another aspect of the invention provides a system for enabling a web application to control a legacy telephone system. The system may comprise a web application for controlling a legacy call server and a legacy telephony device, a call server wrapper for enabling the web application to communicate with the legacy call server, and a telephony device wrapper for enabling the web application to communicate with the legacy telephony device. The system allows a web application to control the call control functions and service control functions of the legacy call server and the user interface functions of the legacy telephony device.

It is to be understood that both the foregoing general description and the following detailed description are exemplary and explanatory only and are not restrictive of the invention, as claimed.

III. BRIEF DESCRIPTION OF THE DRAWINGS

The accompanying drawings, which are incorporated in and constitute a part of this specification, illustrate an embodiment of the invention and together with the description explain the advantages and principles of the invention.

IV. DETAILED DESCRIPTION

Reference will now be made in detail to an implementation of the invention as illustrated in the accompanying drawings. In the following description, for purposes of explanation, numerous specific details are set forth in order to provide a thorough understanding of the present invention. One skilled in the art, however, will realize that the present invention may be practiced without these specific details. In other instances, standard structures and devices are shown in block diagram form in order to facilitate description.

The present application is related to, and incorporates by reference U.S. patent application Ser. No. 09/414,521 of K. Scott Ramey, Craig Will, and Larry David entitled METHOD, APPARATUS, AND ARTICLE OF MANUFACTURE FOR WEB-ENABLING LEGACY TELEPHONY DEVICES filed on Oct. 8, 1999, now abandoned and U.S. patent application Ser. No. 09/414,589 of K. Scott Ramey and Michel Burger entitled METHOD, APPARATUS, AND ARTICLE OF MANUFACTURE FOR WEB-BASED CONTROL OF A CALL SERVER filed on Oct. 8, 1999, now abandoned.

In one embodiment, steps according to the present invention are embodied in machine-executable software instructions, and the present invention is carried out in a processing system or systems by a processor executing the instructions, as will be described in greater detail below. Those skilled in the art will recognize that other embodiments, for example hardwired circuitry, may be used in place of, or in combination with, software instructions to implement the present invention.

Definitions

As used herein, a legacy telephone system can be a Private Branch Exchange (PBX) or other similar switching system, and the telephony devices associated with it. The legacy telephone system is controlled by a call server system which lacks the ability to communicate over an IP network, such as the World Wide Web, with a web application. As used herein, a legacy telephony device is primarily a voice communication device, such as a telephone, designed for use with a legacy telephone system and which lacks the ability to communicate directly with a web application. Apparatus and methods consistent with the principles of the invention interface an IP network and a legacy telephony system which lacks the ability to communicate with applications on the IP network.

As used herein, call server system is a collection of elements, including a call server, that function to control telephone calls and telephone services offered by the legacy telephone system or by a telephone system employing aspects of the present invention. As is known in the art, a call server can be implemented in many ways, for example as a computer program or application, or as hard-wired circuitry. Apparatus and methods consistent with the principles of the invention act as an interface between an IP network and a legacy call server system, which lacks the ability to communicate with web applications on an IP network.

Web application, as used herein, is generally a computer program or equivalent implementation in hardware, or a combination of both, that allows specified data to be accessed over an IP network, such as the World Wide Web. For example, a web application may provide the results of a directory lookup, voice messages, stock quotations, or a streamed audio radio broadcast. A web application may also provide data in the form of commands, for example, commands to a call server system or a telephony device. A web application may connect directly to the present invention's application program interface (API), or it may have no inherent capability to communicate with the present invention.

Network Environment

Figure 1:
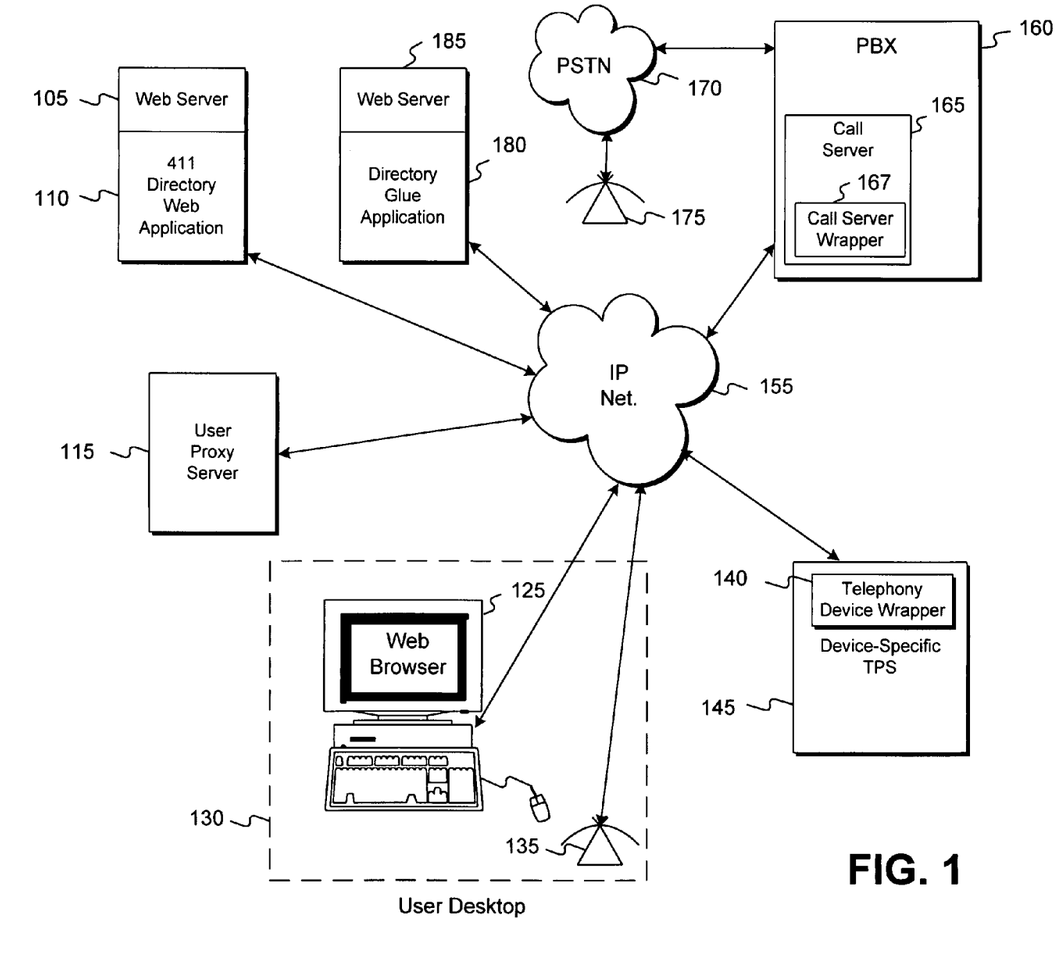
FIG. 1 is a block diagram of a system for enabling a web application to control the elements of a legacy telephone system consistent with the principles of the present invention.

FIG. 1 is a system diagram illustrating a networking environment consistent with the present invention. One embodiment of the present invention includes three components: a call server wrapper 167, which enables a legacy call server 165 to communicate with a web application, such as web application 110 or 180; a telephony device wrapper 140 which enables a legacy telephony device 135 to communicate with a web application, such as web application 110 or 180; and a web application, such as web application 110 or 180, which communicates with either or both call server 165 and telephony device 135. In one embodiment, call server wrapper 167 is a computer program or application executing on call server 165 and telephony device wrapper 140 is a telephony-device-specific computer program or application executing on a terminal proxy server (TPS) 145.

Although telephony device 135 is shown directly connected to an IP network 155, telephony device 135 cannot communicate directly with a web application such as web application 110 or 180. In the example shown in FIG. 1, telephony device 135 is a standard legacy telephone with the ability to communicate in internet protocol, such as a Nortel Model 12004 etherphone, but it has no knowledge of the API of any web applications, nor does a web application have any knowledge of it's API. Therefore, they cannot communicate directly. Telephony device 135 communicates directly only with telephony device wrapper 140, which has full awareness of telephony device 135's API.

Wrappers 167 and 140 communicate over IP network 155 and provide API's to web applications connected to IP network 155 for communicating with call server 165 and telephony device 135 respectively. Entities shown connected to IP network 155 can access each other in a standard manner, for example using a universal resource locator (URL).

FIG. 1 depicts two web servers, a web server 105, and a web server 185 communicatively connected to IP network 155. Web server 105 and web server 185 make a "411" directory web application 110 and a directory glue application 180 available, respectively, over IP network 155. Directory glue application 180 provides an interface between 411 directory web application 110 and wrappers 167 and 140, which allows 411 directory web application 110 and wrapper programs 167 and 140 to communicate with each other. Directory glue application 180 may also provide a user interface, such as a graphical user interface (GUI), for communicating with 411 directory web application 110, wrapper programs 167 and 140, and ultimately with legacy telephony device 135 and legacy call server 165. In one embodiment, directory glue application 180 is a remotely located part of wrappers 140 and 167. 411 directory web application 110 is merely one example of a web application that the present invention enables to inter-work with a legacy telephone system. One of ordinary skill in the art will realize that the present invention enables inter-working with any web application.

In one embodiment, applications, such as 411 directory web application 110 and directory glue application 180 are Java applets executable on a web browser. For example, PC 125 loads a web page including a Java applet web application from a web application server, such as web server 105 or web server 185. The Java applet web application allows control of call server 165 and telephony device 135 from the browser of PC 125. The web application need not be located remotely from the web browser; it could, for instance, be hosted on PC 125.

A user desktop 130 comprises PC 125 and telephony device 135. In one embodiment, telephony device 135 is a conventional legacy telephone and PC 125 a conventional PC. Telephony device 135 is conventionally connected to PBX 160 through an IP network 155.

TPS 145 is a conventional high-speed server computer, such as a workstation. TPS 145 is connected to IP network 155. In this embodiment, TPS 145 provides a host for telephony device wrapper 140, which provides a communication channel between telephony device 135 and web entities such as 411 directory web application 110.

In one embodiment of the present invention, a user proxy server 115 is communicatively connected to IP network 155. User proxy server 115 controls access to call server wrapper 167 and call server 165. In this embodiment, a web application, such as 411 directory web application 110 and directory glue application 180, communicates with user proxy server 115 instead of call server wrapper 167 and telephony device wrapper 140. User proxy server 115 determines the identity and privileges of a web application user, and determines whether to pass data from the web application to call server wrapper 167 and telephony device wrapper 140 based on the user's identity and privileges.

Call server 165 controls calls and services in PBX 160. PBX 160 is connected to PSTN 170, which is connected to telephony device 175. As is well-known in the art, call server 165 controls the calls and services in PBX 160. Telephony device 135 is connected to PBX 160 and can make and receive calls in a conventional manner; the presence of the present invention is transparent to a user when telephony device 135 is used in a conventional manner. In one embodiment, PBX 160 comprises a conventional legacy PBX, which thus lacks the ability to communicate with web applications on IP network 155, which could be, for example, the World Wide Web.

Directory Lookup

Assume for the purposes of example that telephony device 135 has a two-line LCD display, a speaker, and a handsfree mode. A user at telephone 135 wishing to call a person at telephone 175 needs to know the telephone number of telephone 175. In accordance with the principles of the present invention, a user uses 411 directory web application 110 to place the call, as will be described below.

In one embodiment of the present invention, a user uses telephone 135 to look up the telephone number by accessing 411 directory web application 110 through telephony device wrapper 140. 411 directory web application 110 and telephony device wrapper 140 allow the user to search the directory using the user interface available on telephone 135. For example, the directory may display two lines at a time on the two line display of telephone 135, allowing the user to jump and scroll through the directory using the function keypad of telephone 135. Once the correct name is found, the user may select the corresponding number by, for example, pressing a specified keypad button. Telephony device wrapper 140 forwards the selected number to 411 directory web application 110.

In response to the selection, 411 directory web application 110 communicates with telephone 135 through telephony device wrapper 140, commands telephone 135 into handsfree mode, and activates the telephone's speaker. 411 directory web application 110 also communicates with call server 165 through call server wrapper 167, and commands call server 165 to make a call connection from telephone 135 to the telephone number selected by the user.

The user hears telephone 135 go offhook, and then hears destination telephone 175 ring or return a busy signal as the connection is made. Thus, the user hears exactly what would be heard if a handsfree call had been made by manually dialing with the keypad.

In another embodiment of the present invention, web application 110 does not communicate directly with call server 165 through call server wrapper 167. Instead, it communicates with user proxy server 115, and user proxy server 115 communicates with call server 165 through call server wrapper 167. This embodiment provides enhanced security because call server wrapper 167 need only accept commands from a particular number of known user proxy servers 115, instead of numerous telephony devices 135.

Complimentary User Interface

Assume for purposes of example that a user at user desktop 130 wishes to call the person at telephone 175, but does not know the telephone number. Assume also that 411 directory web application 110 is a legacy web application having no inherent ability to inter-work with call server wrapper 167 and telephony device wrapper 140. Further assume that telephony device 135 is a telephone featuring a speaker and a handsfree mode, and that PC 125 is associated with telephony device 135; for example, it knows the IP address and telephone number of telephony device 135.

To make the call in a conventional architecture, the user accesses 411 directory web application 110 using PC 125 and searches the directory for the name of the person at telephone 175. The user then presses the handsfree key on telephone 135 to go offhook, waits for a dialtone, and manually enters on the dial keypad the telephone number displayed by the GUI of 411 directory web application 110. At this point, the user hears destination telephone 175 ring or return a busy signal.

The present invention implemented using a web browser on PC 125 allows the user to place the same call without using the user interface of telephone 135. To place the call, the user first downloads directory glue application 180 into PC 125 from web server 185 using a web browser on PC 125. Directory glue application 180 is specifically designed to place a call and to communicate with 411 directory web application 110, call server wrapper 167, and telephony device wrapper 140. Directory glue application 180 runs on the web browser and provides a GUI on PC 125 for presentation and control of the functions of directory glue application 180.

Using the GUI on PC 125, the user searches a directory provided by 411 directory web application 110. Directory glue application 180 presents the telephone number associated with each name in a way that makes the number selectable, for example, as a hyperlink. The user finds the name of the person at telephone 175 and selects the person's telephone number to make a call, for example, by clicking on the hyperlink.

In response to the user's selection, directory glue application 180 executing on PC 125's web browser initiates a call. Directory glue application 180 gets the information identifying telephone 135 from PC 125, and using call server wrapper 167's API, commands call server 165 to make a call connection from telephone 135 to the telephone number selected from 411 directory web application 110.

Call server wrapper 167 translates and passes the call control command and associated data to call server 165, and translates and passes call server 165's response, for example, that the call is proceeding, back to directory glue application 180. Directory glue application 180 then updates its browser GUI with the response information.

Using a standard device control interface (not shown), call server 165 communicates over IP network 155 with telephony device wrapper 140. Telephony device wrapper 140 is designed to communicate with call server 165's device control interface. Telephony device wrapper 140 may be designed to communicate with applications in addition to the device control interface of call server 165, for example by using a plugin designed to communicate with a web application. Call server 165 sends a command to turn on the handsfree mode of telephone 135 and sends appropriate progress data. Telephony device wrapper 140 translates the command and data to a format telephone 135 can understand, for example H.248 command format, and transmits them to telephone 135. In response, telephone 135 goes into handsfree mode, and the user hears telephone 135 go off-hook and hears destination telephone 175 ring or return a busy signal as the connection is made, exactly as if the user had made a handsfree call by manually dialing with the keypad.

Once the call is proceeding, it can be controlled in a conventional manner via the user interface of telephone 135. In one embodiment of the present invention, the call can also be controlled by directory glue application 180. For example, directory glue application 180 monitors the call state through call server wrapper 167 as the call proceeds. Directory glue application 180 presents a GUI control, for example, a "hangup" button, for controlling the ongoing call. If the user clicks on the hangup button, directory glue application 180 sends the appropriate commands to release the call to call server 165 through call server wrapper 167.

In another embodiment, 411 directory web application 110 is designed with the ability to inter-work with the present invention embodied in call server wrapper 167 and telephony device wrapper 140, obviating the need for directory glue application 180.

The above complimentary user interface example can also be used to illustrate the functioning of the present invention embodied with a user proxy server 115. In the user proxy server embodiment, all direct communications to entities connected to IP network 155 are originated by user proxy server 115. For purposes of example, in addition to the assumptions above, further assume that telephone 135 was previously registered with user proxy server 115, for example, by automatic self registration when telephony device wrapper 140 was initiated, or manual registration by a user at desktop 130. Thus, user proxy server 115 is aware of how to communicate with telephone 135 through telephony device wrapper 140.

To do a directory lookup, a user at PC 125 first registers with user proxy server 115 using a web browser. Then the user performs a directory lookup using 411 directory web application 110 through user proxy server 115; that is, the user communicates with user proxy server 115, which in turn communicates with web server 105. The response of the directory lookup is received by user proxy server 115, which sends a representation of the response to the user at web browser 125, or at telephone 135 through telephony device wrapper 140. The user can make a call based on the response information, for example the telephone number of the person looked up, by using either pc-based web browser 125, or telephone 135.

In this embodiment, however, the request to make a telephone call is transmitted from PC 125 ir telephone 135 to user proxy server 115, which in turn communicates an appropriate connect command to call server wrapper 167. When user proxy server 115 receives a response from call server 165, it may command telephone 135, through telephony device wrapper 140, to go off hook and open a media channel for the call.

Email A Telephone Call

A user at user desktop 130 can email a telephone call to a person at another telephone using the present invention. Assume for the purposes of this example that a user at user desktop 130 wishes to email a message, including instructions to call back and confirm, to a recipient. Further assume that PC 125 is associated with telephony device 135; for example, that it knows the IP address and telephone number of telephony device 135, and that the recipient has the same desktop configuration (not shown) as desktop 130. Finally, assume that a mailing web application (not shown) is made available over IP network 155 by web server 185.

To email a telephone call, the user at desktop 130 loads the mailing web application onto a web browser executing on PC 125 from web server 185. The mailing web application allows the user to include a method for activating a telephone call in the email message, for example, by using a hyperlink or appending a Java applet. Using the mailing web application GUI, the user creates an email message that concludes, for example, the hyperlink "Please call be back to confirm at http:\abcwww\cgi-bin\callme," and sends the message to the recipient.

The recipient opens the email message and double clicks on the hyperlink to activate a telephone call to the user. The hyperlink goes to an IP network address and executes a CGI script on the server for the address. The CGI script activates the mailing web application, which places the call by sending appropriate commands to call server 165 through call server wrapper 167.

Call server 165 causes the recipient's telephone (not shown) to go offhook, then rings the user's telephone 135. When the user picks up, the call is established.

The Call Server Wrapper Program

In order for a web application and a call server to communicate with each other, they must either use the same API format or have a translator between API's. Apparatus and methods consistent with the principles of the present invention translate data transferred between a web application and a call server system into formats compatible with each.

Figure 2:
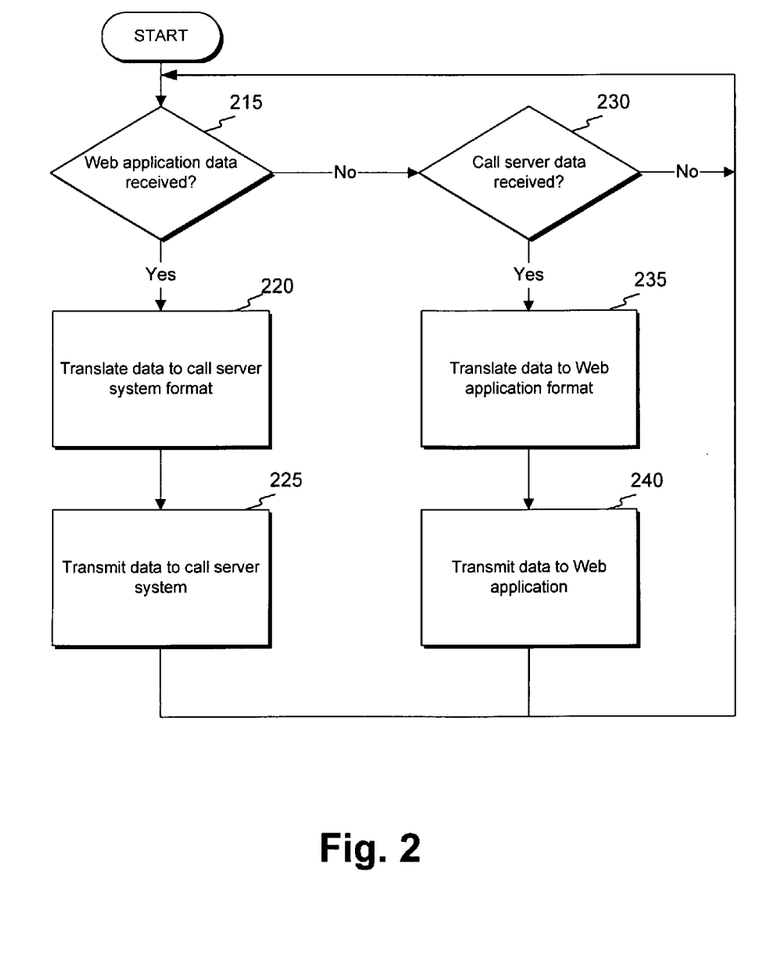
FIG. 2 is a flow chart of steps performed by a call server wrapper for enabling a web application to communicate with a call server system consistent with the principles of the present invention.

FIG. 2 is a flow chart illustrating the steps performed by call server wrapper program 167 of FIG. 1 consistent with the principles of the present invention. Call server wrapper program 167 first determines whether data was received from a web application (step 215). If web application data was received, call server wrapper program 167 translates the data from web application format to call server system format (step 220), and transmits the translated data to the call server system element handling the communication from the web application (step 225). Web application format is a format that call server wrapper program 167 can receive and understand, which is used by a web application communicating with call server wrapper program 167. Call server system format is a format that a call server system can receive and understand. Processing then returns to determining whether additional web application data was received (step 215).

If web application data is not received (step 215), call server wrapper program 167 determines whether call server data was received from the call server system element handling the communication from the web application (step 230). If call server data was received, call server wrapper program 167 translates the data from call server system format to web application format (step 235), and transmits the translated data to the web application (step 240). Processing then returns to determining whether additional web application data was received (step 215).

Call server wrapper program 167 handles translations between data in a web application format and data in a call server format. This allows legacy call server systems to interact with web-enabled entities on an IP network, such as the World Wide Web.

Call Server Wrapper—Web Application Interface

Call server wrapper program 167 comprises two interfaces: a web application program interface (API) through which it communicates with a web application executing on PC 125, and a call server system interface through which it communicates with an entity in call server 165. Call server wrapper program 167 provides a uniform user interface for all types of call server systems, such as PBX's, and may be designed to interface with any model and manufacturer. Thus, call server wrapper program 167 allows web applications and call server systems to interact with each other without reprogramming either end to provide data in a format specific to the other end.

The web API of call server wrapper program 167 defines the web application data format. That is, the web API specifies the format of the data communicated between a web application and call server wrapper program 167. In one embodiment, the web API allows the web application data to be in the format of a call control command. A call control command causes call server 165 to perform a function which controls a telephone call or which returns the status of a telephone call or of call server 165. For example, a call control command may cause call server 165 to make a connection between two telephony devices.

In one embodiment, call server control commands are broken down into primitives. The number of primitives may be fewer than the number of call server control commands. The web API specifies that the web application data be in the form of the primitives. Reducing the number of call control commands to a small group of primitives simplifies the call server wrapper interface to web applications. Complex call control functions are realized by using combinations of the call control command primitives.

In one embodiment, the web API allows the web application data be in the format of a service control command. A service control command causes call server 165 to affect a telephony service for a telephony device. For example, the web API may include an add caller id(user) service control command, which enables a caller id service for the telephone identified by the user parameter. In another example, the web API includes a ring(user, ring) service control command, which changes the ring pattern according to the ring parameter for the telephone identified by the user parameter.

Call Server Wrapper—Call Server System Interface

The call server system that call server wrapper 167 communicates with defines the call server data format. More particularly, the call server system's interface defines the format requirement of the data communicated between call server 165 and call server wrapper program 167. The present invention converts data from a web application format into a call server system data format before transmitting the converted data to the call server system.

Many conventional call server systems have a computer telephony interface (CTI) in place for outside control of a call server. In one embodiment, call server wrapper 167 communicates with call server 165 in a call server data format defined by the CTI.

The Telephony Device Wrapper Program

To communicate, a web application such as 411 directory web application 110 and telephony device 135 must have a communication path between them and use the same API or have a translator. Apparatus and methods consistent with the principles of the present invention provide a communication channel between a web application and a telephony device and translate data transferred between web application and a telephony device into formats the APIs of each understands.

Figure 3:
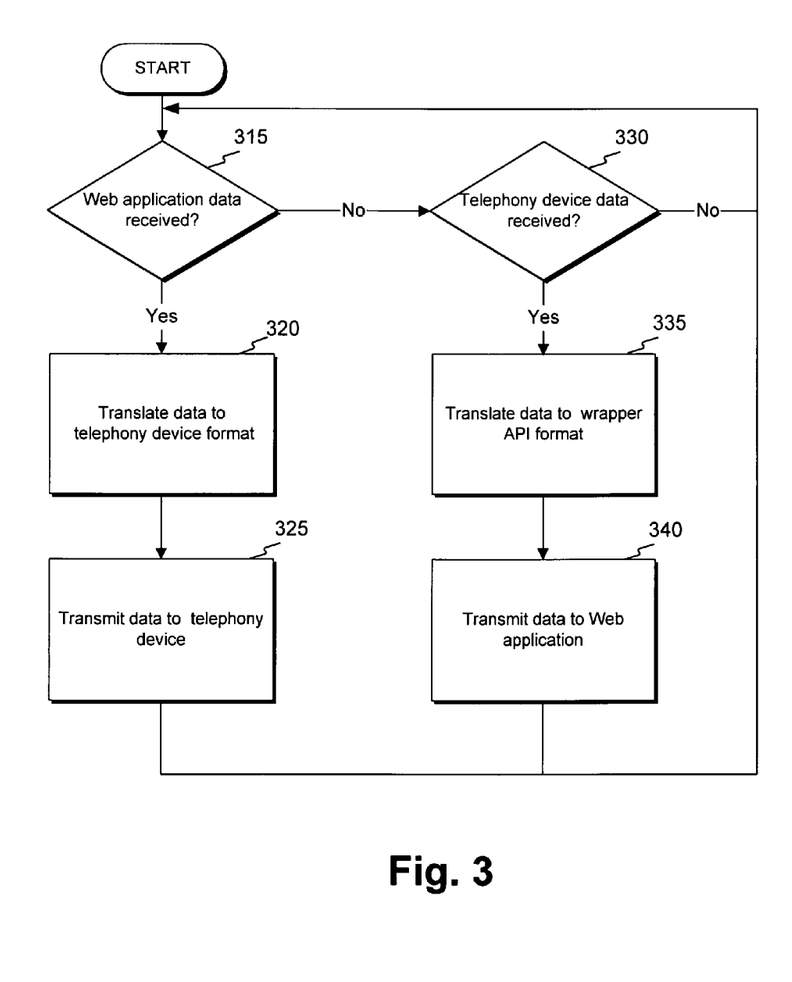
FIG. 3 is a flow chart of steps performed by a telephony device wrapper for enabling a web application to communicate with a telephony device consistent with the principles of the present invention.

FIG. 3 is a flow chart of the steps performed by telephony device wrapper program 140 consistent with the principles of the present invention. Telephony device wrapper program 140 first determines whether any data was received from a web application, for example 411 directory web application 110 (step 315). If web application data was received, telephony device wrapper program 140 translates the data from a web API format to a telephony device data format (step 320) and transmits the translated data to telephony device 135 (step 325). Web API format is a format that telephony device wrapper program 140 can receive and understand, which must be used by a web application communicating with telephony device wrapper program 140. Telephony device data format is a format in which the telephony device 135 communicates.

If no web application data has been received (step 315), telephony device wrapper program 140 determines whether telephony device data was received from telephony device 135 (step 330). If telephony device data was received, telephony device wrapper program 140 translates the data from telephony device data format to web API format (step 335) and transmits the translated data to 411 directory web application 110 (step 340). Processing then continues with telephony device wrapper program 140 determining whether web application data has been received (step 315).

Logical Configuration

Figure 4:
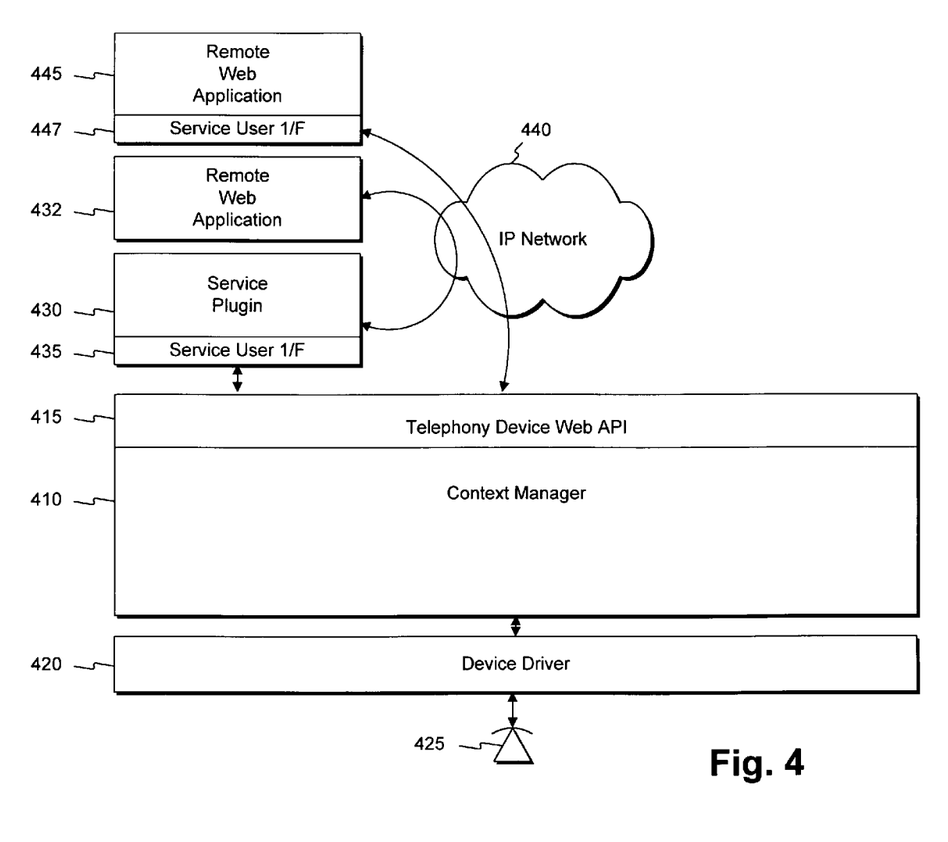
FIG. 4 is a block diagram showing a logical configuration of software modules consistent with the principles of the present invention.

One embodiment of telephony device wrapper is composed of logical components as shown in FIG. 4. More particularly, the embodiment is composed of a device driver 420, a context manager 410, and service plugin 430. The software configuration of FIG. 4 is only one possible embodiment of elements consistent with the principles of the present invention.

Telephony Device Wrapper—Telephony Device Interface

Device driver 420 communicates with telephony device 425 using a telephony device data format. Telephony device 425 defines the requirements of the telephony device data format. More particularly, the interface for telephony device 425 defines the format requirements of the data communicated between telephony device 425 and device driver 420. Device driver 420 converts web application data from context manager 410 into a telephony device data format before transmitting the converted data to telephony device 425. Conversely, device driver 420 converts telephony device data from telephony device 425 into a web API format before passing the converted data to context manager 410.

The telephony device data formats used by existing telephony devices are well-known in the art. Generally, telephony devices use a well-defined communications protocol such as H.248. In one embodiment, context manager 410 communicates directly with telephony device 425 using the device's native data format.

Telephony Device Wrapper—Web Application Program Interface

The present invention also provides a simple user interface for each telephony device, so that a wide variety of web applications can easily access a device without knowledge of the telephony device's specific operating details. Context manager 410 contains a telephony device wrapper web application program interface (API) 415 for communicating, either directly or indirectly, with a web application.

Telephony device wrapper web API 415 specifies the format of the data communicated between a web application, such as web application 445, and the present invention. In another embodiment, if a web application such as remote web application 432 cannot communicate with the telephony device wrapper web API 415 in web API data format, then a service plugin 430 translates the native data format of web application 432 into the appropriate web API data format before passing the web application's data to telephony device wrapper web API 415.

In one embodiment, wrapper web API 415 uses an abstraction to represent telephony device 425. The abstraction generalizes the characteristics of a telephony device resource so that a web application can use a resource without knowing specifics of the resource's implementation. A resource of a telephony device is any feature or ability of the device that can be used by a web application. For example, a resource could be a handset, a speaker, a two-line LCD display, or keypad buttons. An example of an abstraction of a resource is to represent a two-line, 28 character, LCD display as a general text display resource with no limits on the number of lines or characters.

In another embodiment, the wrapper web API 415 uses an abstraction to represent a class of telephony devices which share similar characteristics. For example, a class of display telephones may include member types that have two line displays, four line displays, and four inch by four inch bit-mapped displays. All of these similar displays could be represented by an abstraction which defines a general text display resource with no limits on the number of lines or characters. Wrapper web API 415 may use this abstraction to communicate with web applications, hiding the details of the actual device display from the web application.

Context Manager

Although an abstraction provides a relatively simple API to web applications, the data received through an abstracted API generally cannot be directly used by a telephony device. In another embodiment, to alleviate this problem, context manager 410 maps the abstract data to the telephony device's actual resources. Mapping involves configuring the data transferred by remote web application such as remote web application 445, into a form that can be utilized by the telephony device 425. In an embodiment where telephony device wrapper web API 415 uses an abstraction to represent a class of telephony devices, the invention keeps track of which devices among those in the class are connected, and maps web application data according to each device's actual resources.

Telephony device 425 may have several resources. For example, telephony device 425 may have a speaker resource, a two-line display resource, a numeric keypad resource, and a function keypad resource. In one embodiment, context manager 410 arbitrates access to a telephony device's resources so that two or more web applications may share the resources of a single telephony device. To arbitrate, context manager 410 keeps track of the state of each web application and telephony device resource and prioritizes which web application may use a resource. For example, web application 445 may be using telephony device 425's two-line display, when web application 432 tries to write data to the same display. The context manager 410 arbitrates access to the two-line display, holding the web application 432's data until the first web application finishes using the display.

For data moving from telephony device 425 to a web application, one embodiment of the present invention routes signals, such as stimulus data coming from a telephony device to the web application. In this embodiment, context manager 410 keeps track of which stimulus resources of a telephony device belong to which web application, and directs stimulus inputs to web applications accordingly. For example, assume wrapper web API 415 for telephony device 425 contains a speaker resource and a display resource. Web application 445 uses the display resource to show a string of real time stock quotes requested by a user. At the same time, web application 432 uses the speaker resource to stream broadcast news audio. If, for example, the stock quotation web application 445 recognizes telehony device 425 keypad strokes "#9" as a command to stop providing quotations, and the telephony device user presses "#9," then the context manager 410 routes the "#9" stimulus data to the stock quotation web application 445 rather than to the streaming audio web application 432.

Service Plugins

In another embodiment of the invention, where a web application such as web application 432 cannot communicate with the present invention's telephony device wrapper web API 415 in web API data format, then the present invention provides a service plugin 430 between wrapper web API 415 and web application 432. Service plugin 430 allows web application 432 and the telephony device wrapper web API 415 to communicate with each other. Service plugin 430 is a telephony-device-specific and web-application-specific custom interface. For example, assume web application 432 is designed to stream audio to a sound card on the PC hosting the web browser which accessed the web application. Web application 432 does not have information regarding communication with the present invention's wrapper web API 415, which includes, for example, an abstraction of a telephone audio speaker. To stream audio data from web application 432 to the telephone's speaker, service plugin 430 receives the setup control data transmitted by web application 432, converts it into API data format, and sends it to telephony device wrapper web API 415 for preparing the speaker of telephony device 425 to accept a streamed audio connection.

In another embodiment, a service plugin 430 contains a service user interface 435 which provides a telephony device-specific user interface for a web application 432.

In yet another embodiment, service plugin 430 is implemented as an optional plugin to the present invention. The optional plugin is only included if a user desires telephony device 425 to communicate with the specific web application for which the service plugin is customized. In this embodiment, the telephony device wrapper provides an execution environment for service plugin 430. An execution environment allows a software application to function on a host system. For example, the present invention may provide a JAVA™ virtual machine for executing service plugins implemented as JAVA™ plugins. A service plugin may be implemented to execute on a remote system and communicate with API 415 over a network, without loss of compatibility with the present invention. In another embodiment, service plugins may interact with each other, as well as with wrapper API 415.

Web Application Program

As previously mentioned, a web application is any entity on IP network 155 capable of providing data to either or both call server wrapper 167 and telephony device wrapper 140. In one embodiment, a web application communicates with a wrapper program using a web application data format.

Figure 5:
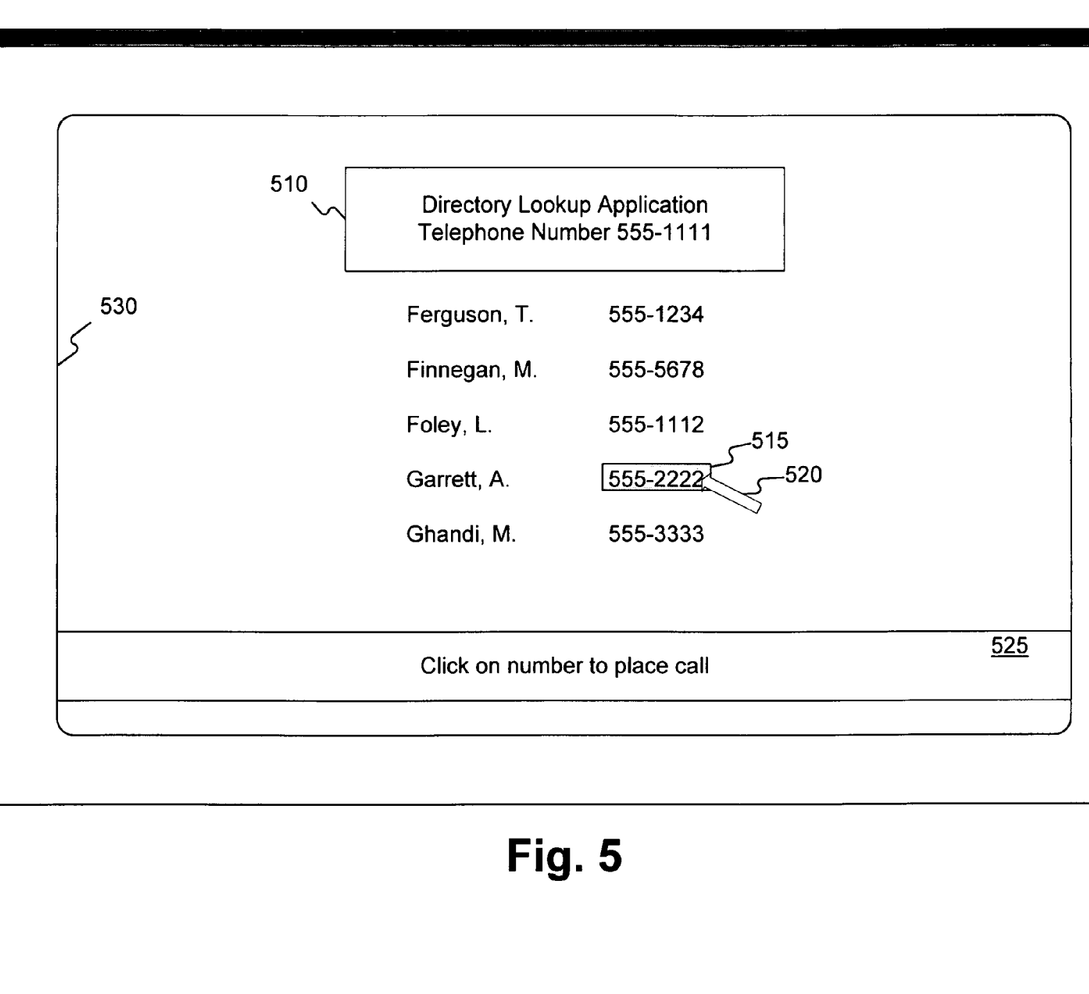
FIG. 5 is a diagram of a graphical user interface of a web application for communicating with a call server system.

FIG. 5 shows an example of a web browser graphical user interface 530 on PC 125 for a web application. A title 510 shows that a user at telephone number 555-1111 has loaded a directory lookup web application, such as 411 directory web application 110 on web browser 125. The web application's GUI allows the user to select a telephone number 515 from the directory list, using the cursor 520. If the user clicks on the selected number, the web application causes a call to be placed (denoted in area 525) by communicating with call server 165 through call server wrapper program 167. Web application 110 directs call server 165 to connect the telephone 135 at 555-1111 to the selected telephone 175 at 555-2222. In one embodiment, web application 110 communicates call control commands directing call server 165 to place the call. In another embodiment, web application 110 commands caller telephone 135 to go offhook and into handsfree mode when a connection is made.

Figure 6:
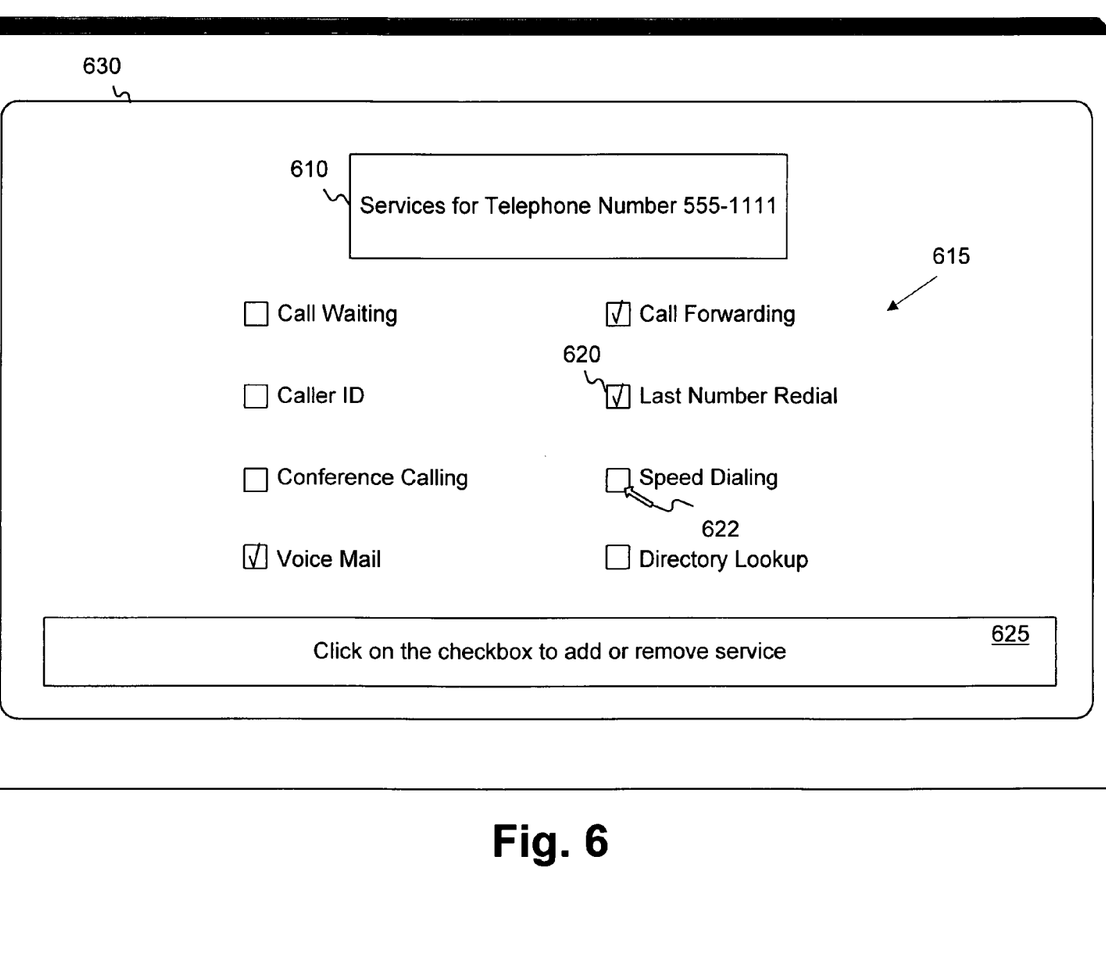
FIG. 6 is a diagram of a graphical user interface of a web application for communicating with a call server system.

FIG. 6 shows an example of a web browser graphical user interface 630 on PC 125 for a web application. A title 610 shows that a user at telephone number 555-1111 represented by telephony device 135 is invoking a telephone services web application (not shown) on web browser 125. The web application GUI allows a user to add or remove services for their telephone (denoted in area 625). The web application lists the services available 615 and allows the user to add or remove services by clicking on a checkbox 620 using the cursor 622. If the user clicks a checkbox, the web application communicates this change to call server 165 through call server wrapper program 167. The web application directs call server 165 to add the selected service, for example speed dialing, to the user's telephone 135 at 555-1111. In one embodiment, the web application communicates service control commands to cause call server 165 to add or remove the selected service.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for web-based control of a legacy telephone system, comprising:
    enabling a legacy call server to communicate with a web application by providing a call server wrapper program having a first web application program interface (API) and a call server system interface, the call server wrapper program operable for:
        receiving at the first web API, via an internet protocol (IP) network, a command from the web application in a web application data format,
        translating the command from the web application data format into a call server system data format, and
        sending the command in the call server system data format to the call server; and
    enabling a legacy telephony device to communicate with the web application by providing a telephony device wrapper program having a second web application program interface (API) and a telephony device interface, the telephony device wrapper program operable for:
        receiving at the second web API, via the internet protocol (IP) network, data from the web application in a web application data format,
        translating the data from the web application data format into a telephony device data format, and
        and sending the data in the telephony device data format to the telephony device.

2. The method of claim 1, wherein enabling the legacy call server to communicate with the web application comprises:
    providing a communication channel between the legacy call server and the web application.

3. The method of claim 2, wherein providing a communication channel comprises:
    using a user proxy server to control access to the legacy call server.

4. The method of claim 1, wherein the command comprises a one of a call control command and a service control command.

5. The method of claim 1, wherein enabling a legacy telephony device to communicate with the web application comprises:
    providing a communication channel between the legacy telephony device and the web application.

6. The method of claim 1, comprising:
    using a telephony device abstraction.

7. The method of claim 6, wherein using a telephony device abstraction comprises:
    using an abstraction for a class of telephony devices.

8. The method of claim 1, further comprising:
    providing a service plugin operable for communicating between the second web API of the telephony device wrapper program and the web application.

9. The method of claim 1, wherein the web application is an interface to a telephony device.

10. An apparatus for web-based control of a legacy telephone system, comprising:
    means for enabling a legacy call server to communicate with a web application by providing a call server wrapper program having a first web application program interface (API) and a call server system interface, the call server wrapper program operable for:
        receiving at the first web API, via an internet protocol (IP) network, a command from the web application in a web application data format,
        translating the command from the web application data format into a call server system data format, and
        sending the command in the call server system data format to the call server; and
    means for enabling a legacy telephony device to communicate with the web application by providing a telephony device wrapper program having a second web application program interface (API) and a telephony device interface, the telephony device wrapper program operable for:

receiving at the second web API, via the internet protocol (IP) network, data CD from the web application in a web application data format, translating the data from the web application data format into a telephony device data format, and and sending the data in the telephony device data format to the telephony device.

11. The apparatus of claim 10, wherein the means for enabling the legacy call server to communicate with the web application comprises:

means for providing a communication channel between the legacy call server and the web application.

12. The apparatus of claim 11, wherein the means for providing a communication channel comprises:

means for using a user proxy server to control access to the legacy call server.

13. The apparatus of claim 10, wherein the command comprises a one of a call control command and a service control command.

14. The apparatus of claim 10, wherein the means for enabling a legacy telephony device to communicate with the web application comprises:

means for providing a communication channel between the legacy telephony device and the web application.

15. The apparatus of claim 10, comprising:

means for using a telephony device abstraction.

16. The apparatus of claim 15, wherein the means for using a telephony device abstraction comprises:

means for using an abstraction for a class of telephony devices.

17. The apparatus of claim 10, further comprising:

means for providing a service plugin operable for communicating between the second web API of the telephony device wrapper program and the web application.

18. The apparatus of claim 10, wherein the web application is an interface to a telephony device.

19. A computer program product comprising:

a computer usable medium having computer readable code embodied therein for web-based control of a legacy telephone system, the computer readable code operable for:

enabling a legacy call server to communicate with a web application by providing a call server wrapper program having a first web application program interface (API) and a call server system interface, the call server wrapper program operable for:

receiving at the first web API, via an internet protocol (IP) network, a command from the web application in a web application data format, translating the command from the web application data format into a call server system data format, and sending the command in the call server system data format to the call server; and enabling a legacy telephony device to communicate with the web application by providing a telephony device wrapper program having a second web application program interface (API) and a telephony device interface, the telephony device wrapper program operable for:

receiving at the second web API, via the internet protocol (IP) network, data from the web application in a web application data format, translating the data from the web application data format into a telephony device data format, and and sending the data in the telephony device data format to the telephony device.

20. A system for enabling a web application to control a legacy telephone system comprising:

a web application for independently controlling a legacy call server coupled to the telephone system and a legacy telephony device;

a call server wrapper having a first web application program interface (API) and a call server system interface for enabling the web application to communicate with the legacy call server, the first web API operable for receiving web application data in a first format over an internet protocol (IP) network from the web application and translating the received web application data into a second format, the call server system interface operable for transmitting the translated web application data in the second format over the IP network to the legacy call server; and a telephony device wrapper having a second web application program interface (API) and a telephony device interface for enabling the web application to communicate with the legacy telephony device, the second web API operable for receiving web application data in a first format over the IP network from the web application and translating the received web application data into a second format, the telephony device interface operable for transmitting the translated web application data in the second format over the IP network to the legacy telephony device.

21. A system for enabling a web application to control a legacy telephone system comprising:

a web application for independently controlling a legacy call server and a legacy telephony device;

a call server wrapper for enabling the web application to communicate with the legacy call server, the call server wrapper having a first interface operable for receiving web application data in a first format over an internet protocol (IP) network from the web application and translating the received web application data into a second format, the call server wrapper having a second interface operable for transmitting the translated web application data in the second format over the IP network to the legacy call server; and a telephony device wrapper for enabling the web application to communicate with the legacy telephony device, the telephony device wrapper having a first interface operable for receiving web application data in a first format over the IP network from the web application and translating the received web application data into a second format, the telephony device wrapper having a second interface operable for transmitting the translated web application data in the second format over the IP network to the legacy telephony device.

* * * * *

UNITED STATES PATENT AND TRADEMARK OFFICE
CERTIFICATE OF CORRECTION

PATENT NO. : 7,111,056 B1 Page 1 of 1
APPLICATION NO. : 09/414590
DATED : September 19, 2006
INVENTOR(S) : K. Scott Ramey, Michel Burger and Larry David It is certified that error appears in the above-identified patent and that said Letters Patent is hereby corrected as shown below:

Column 14, Claim 1, line 16, delete "and".

Column 15, Claim 10, line 2, delete "CD".

Column 15, Claim 10, line 6, delete "and".

Column 16, Claim 19, line 3, delete "and".

Signed and Sealed this

Ninth Day of January, 2007

JON W. DUDAS
*Director of the United States Patent and Trademark Office*